United States Patent [19]

Barrett et al.

[11] Patent Number: 4,918,588
[45] Date of Patent: Apr. 17, 1990

[54] OFFICE AUTOMATION SYSTEM WITH INTEGRATED IMAGE MANAGEMENT

[75] Inventors: Richard M. Barrett, Chelmsford; Murray Edelberg, Carlisle; Joseph A. Nicholls, Chelmsford; Clinton J. O'Brien, North Billerica; Bruce R. Silver, Weston, all of Mass.

[73] Assignee: Wang Laboratories, Inc., Lowell, Mass.

[21] Appl. No.: 948,375

[22] Filed: Dec. 31, 1986

[51] Int. Cl.$^4$ .............................................. G06F 13/00
[52] U.S. Cl. ................................. 364/200; 364/282.1; 364/225.4
[58] Field of Search ... 364/200 MS File, 900 MS File; 382/69

[56] References Cited

U.S. PATENT DOCUMENTS

| | | | |
|---|---|---|---|
| 4,264,808 | 4/1981 | Owens et al. | 235/379 |
| 4,513,390 | 4/1985 | Walter et al. | 364/900 |
| 4,553,206 | 11/1985 | Smutek et al. | 364/300 |
| 4,587,633 | 5/1986 | Wang et al. | 364/900 |
| 4,589,144 | 5/1986 | Namba | 382/61 |
| 4,644,468 | 2/1987 | Doster et al. | 364/200 |
| 4,654,790 | 3/1987 | Woffinden | 364/200 |
| 4,658,299 | 4/1987 | Tanaka et al. | 358/256 |
| 4,694,352 | 9/1987 | Ina et al. | 358/257 |

Primary Examiner—Gary V. Harkcom
Assistant Examiner—Michael A. Jaffe
Attorney, Agent, or Firm—Michael H. Shanahan; Scott K. Peterson

[57] ABSTRACT

An office automation system that provides for the incorporation of documents of all types by integrating images into the system. A minicomputer-based system includes applications such as word processing, data base, and mail, each of which can access image documents. Bulk storage of document images is provided using a variety of storage media such as microfilm, microfiche, and optical disks. An image access subsystem provides to each of the office automation applications uniform access to images stored on all of the media. The image access subsystem can use a hardware controller to handle some of the complexity of retrieval of images from the image storage devices. A relational data base system is used to organize the stored images so as to provide flexible access to the images and to isolate any effects of reconfiguration of the image storage system.

9 Claims, 5 Drawing Sheets

OFFICE AUTOMATION SYSTEM WITH INTEGRATED IMAGE MANAGEMENT

FIELD OF THE INVENTION

The present invention relates to office automation systems and to systems for providing electronic access to images of documents.

BACKGROUND

Office automation systems support various office tasks. Office automation systems include tools such as: word processing,
- data base systems that support the creation, maintenance, and access to data bases large and small,
- mail systems to facilitate communication both locally and across great distances,
- calendar management to assist individuals and groups coordinate and keep track of their schedules.

Great effort has been expended to capture the content of documents in a "machine readable" form such as a form suitable for data base access or manipulation by a word processor. Many offices have an enormous volume of existing documents in files that are not readily converted to machine readable form. Further, there are many office environments that have a continuing stream of paperwork which is not now (nor likely to be in the near future) readily subject to being captured in machine readable form.

This critical, but not readily convertible, mass of paperwork poses an often insurmountable obstacle to exploiting the use of computer and data communications technologies. the benefit of such technologies is often completely lost even though portions of an office's business are amenable to machine manipulation. This is because it can be inefficient to use a computer-based system when a paper-based system must also be maintained in parallel.

The ability to manipulate document images can often substitute for the manipulation of the original paper documents. This permits the movement of documents by electronic data communications and permits the use of computer-based retrieval. In addition, with electronic document images, a plurality of people can view a single document simultaneously, and the movement of documents can be electronically automated.

However, the substitution of images for paper may not solve the problem, because the image-based world that replaces the paper-based world remains separate from the world of the existing office automation functions. It is desirable to have a single set of office automation tools that are used to handle all an office's documents. Thus, unless image manipulation is integrated into the existing office automation applications, the office worker continues to have the problem of dealing with two separate sets of document processing tools.

A further impediment to the effective use in typical office environments of document images is image storage. Image storage systems are complex and diverse in characteristics. The desirability of using existing microfilm and existing filming equipment suggests the use of automatic microfilm storage and retrieval units (known as SARs). The desirability of rapid retrieval and of digital storage suggest the use of optical disks. The need to modify images suggests the use of magnetic disks. The process of locating and retrieving an image from a SAR differs radically from the process of locating and retrieving an image from a magnetic disk.

Various products have been developed to automate the retrieval of images, for example, the Kodak Image Management System (KIMS), which is based on microfilm. These are specialized systems that do not provide other office automation functions.

Recently, numerous optical disk products for image storage have been introduced, the best example of which is a system developed by Filenet Corporation. These systems provide more office automation tools than do the specialized image management systems. However, they still do not adequately integrate the use of images with these tools. Further, these systems use a single type of bulk image storage (optical disks); many large users need the flexibility to be able to incorporate other types of bulk image storage (such as microfilm and microfiche) into a single system.

The following are objects of the present invention:
- Integrate the use of images in an environment of office automation tools.
- Make image access independent of the type of device on which the image is stored.
- Utilize for image transfer the range of different data communications paths that exist in an office automation environment.
- Minimize data base records that need to be changed as a result of some type of reconfiguration (e.g., when a platter is loaded in a different slot in a juke box).
- Permit an image document to be extended (or otherwise modified) after it has been initially created.
- Permit one to develop a new image manipulating application without the application developer needing to be concerned with the mechanics of image manipulation.

SUMMARY OF THE INVENTION

The present invention uses an existing minicomputer-based office automation environment as the base for an image document management system. The pre-existing office automation tools are extended to recognize objects of the new data type "image document" and to use a single set of image services to manipulate these objects.

Image documents are defined logically, rather than physically. To this end, a general purpose, full power relational data base system is used as a primary tool in the image retrieval process. Image documents can include a plurality of extents, permitting them to grow and change. Image documents can be organized according to users' needs, independent of the physical characteristics of the media upon which they are stored, even if a plurality of different media are used.

An image transfer controller is used for physical management of the image storage devices. This controller facilitates mediaindependent image access and offloads much of the image access work from the rest of the office automation system.

Various image-related devices are provided as system resources, including a character recognition device for converting all or portions of image documents to text form, and a telecopier gateway for sending and receiving images over telephone lines.

BRIEF DESCRIPTION OF THE DRAWING

The invention is pointed out with particularity in the appended claims. The above and other advantages of the invention may be better understood by referring to the following detailed description in conjunction with the drawing, in which:

DETAILED DESCRIPTION

I. System Structure - Hardware

I.A. Overall Hardware Structure

Figure 1:
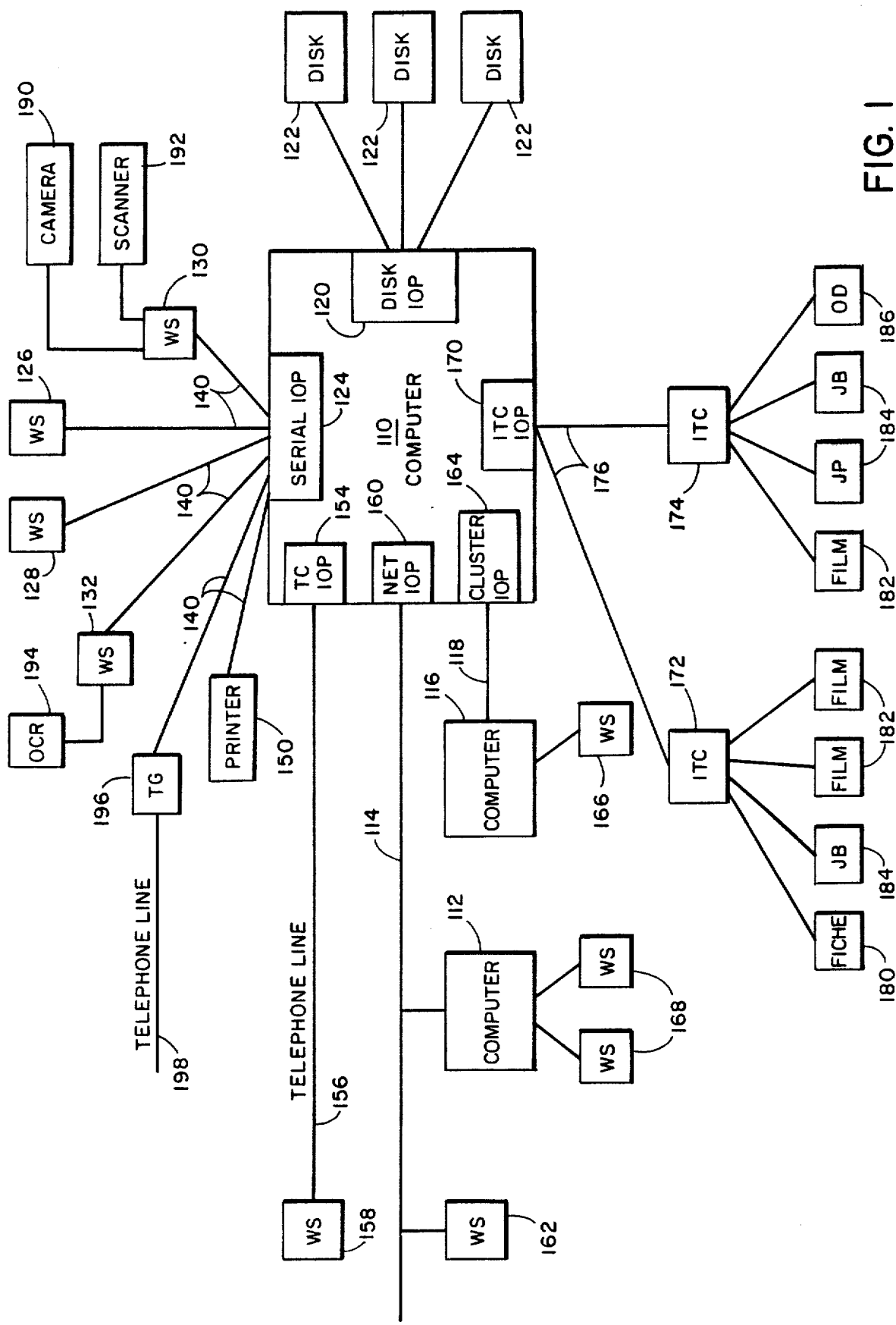
FIG. 1 is a block diagram of the overall hardware structure of an office automation system employing the present invention.

Referring to FIG. 1, an office automation system with integrated images is built around a minicomputer 110. The system may include other minicomputers, such as minicomputer 112 connected by network 114 or minicomputer 116 connected in a computer cluster bus 118. The minicomputers of this illustrative embodiment are VS series computers manufactured by Wang Laboratories, Inc.

The minicomputer 110 connects to peripheral devices by intelligent peripheral control devices known as IOPs (for Input Output Processor).

A disk IOP 120 connects to magnetic disk storage units 122.

A serial IOP 124 provides a high speed serial data link 140 to peripheral devices. This type of data link is described in U.S. Pat. No. 4,145,739, titles DISTRIBUTED DATA PROCESSING SYSTEM. The serial IOP 124 primarily connects to workstations 126, 128, 130, and 132, but can also connect to printers (such as laser printer 150) or other devices (such as telecopier gateway 196).

A telecommunications IOP 154 connects via a telephone line 156 to a remotely located workstation 158.

A network IOP 160 connects to a data communications network 114 such as WangNet (described in U.S. Pat. No. 4,521,881, titled DATA COMMUNICATION WITH INCREASED EFFECTIVE BANDWIDTH.) The network 114 connects to other minicomputers such as the computer 112 and connects to workstations such as workstation 162.

A cluster controller IOP 164 connects via a high speed parallel bus 118 to up to three other minicomputers such as the computer 116. The operation of the cluster controller is described in U.S. patent application Ser. No. 847,086, filed Apr. 1, 1986, and titled HIGH-SPEED LINK FOR CONNECTING PEER SYSTEMS.

The computers 112 and 116, also VS series computers, include IOPs by which these computers also are attached to various peripheral devices such as workstations 166 and 168.

An ITC IOP 170 connects to up to three Image Transfer Controllers (ITC) such as ITCs 172 and 174 via a high speed parallel bus 176. The ITC hardward is described in greater detail in subsection I.D. below. A controller with similar SAR switching operation is described in U.S. patent application Ser. No. 754,116, filed Jul. 12, 1985, titled CASCADABLE, HIGH-BANDWIDTH, MULTI-CHANNEL IMAGE TRANSFER CONTROLLER. The ITC bus 176 is like the cluster bus 118, and the hardware of the ITC IOP 170 is essentially the same as that of the cluster IOP 164. However, the cluster IOP 164 is used to connect exclusively to cluster IOPs in other computers, while the ITC IOP is used to connect exclusively to ITCs.

Each ITC IOP 170 is four logical devices (numbered 0-3). ITCs send data to device 0. Each of the numbers 1-3 is associated with one of the up to three ITCs connected to the IOP 170. The IOP 170 sends data to an ITC by directing it to the loogical device number associated with the ITC.

The ITCs 172 and 174 connect to various devices that store very large numbers of images. These include microfiche storage and retrieval units 180, cassette microfilm storage and retrieval units 182, optical disk jukeboxes 184 (each of which includes one or more optical disk drives), and stand-alone optical disk drives 186.

Depending upon the configuration of the ITC, up to about 60 SARs can be connected to an ITC, or about 40 stand-alone optical disk drives, or about 6 optical disk jukeboxes, or some smaller mixture of SARs, stand-alone drives, and jukeboxes. Performance considerations may dictate further limiting these numbers in situations with high frequency of image access.

I.B. Workstations

Some workstations are image-capable (i.e., capable of using the image access display function) and some are not. The non-image-capable workstations 126 are typically Wang 2256C workstations. Alternatively, these can be Wang Professional Computers (using Intel 8086 processor) or Advanced Professional Computers (using Intel 80286 processor) equipped with a local communications option that provides the high speed serial interface necessary to connect to the serial IOP 124.

The image-capable workstations 128 are Wang Advanced Professional Computers equipped with a high resolution display controller having a memory mapped bitmap of 2048 by 2048 pixels, a 16" monitor displaying 200 dots per inch, and a compression/expansion processor. As with non-image-capable workstations, a local communications option is used to connect to the serial IOP 124. A hard disk drive is optional; if large volume local storage is desired, the workstation can include a hard disk, or it can use space on the disks 122 that are connected to the computer 110.

The compression/expansion processor is a hardware device based on an AMD AM7971 compression/expansion chip. The compression/expansion processor is used to convert images received from the computer 110 in compressed form to uncompressed form that can be displayed. This conversion can be accomplished in software (i.e., without the aid of any special compression/expansion processor hardware); however, because image data is voluminous, this processing is time consuming. The compression/expansion processor is desirable in order to achieve the performance most users are expected to require. See subsection III.C for further discussion of image data compression/expansion.

I.C. Other Peripheral Devices

Continuing to refer to FIG. 1 bulk storage of document images is accomplished using various devices:

microfiche storage and retrieval units 180, microfilm storage and retrieval units 182 (such as model 1011W sold by Imnet Corporation, previously Ragen), and optical disk storage subsystems 184 and 186.

SARs (SAR=Storage and Retrieval unit) include three major subsystems: (1) apparatus for holding microfilm cassettes (or microfiche in the case of a microfiche SAR), (2) a scanner for optically scanning a frame on the microfilm to create a digital representation of the image, and (3) apparatus for retrieving a selected cassette from the holding apparatus and loading it into the scanner and advancing the film to the specified frame.

The holding apparatus of the illustrative microfilm SAR is logically arranged in a 2-dimensional matrix of levels and columns; in other words, a stored cassette can be located by specifying its level and its column. A frame on a cassette is identified by its sequence number (i.e., the number of frames that precede it on the roll of microfilm in the cassette). Thus, in response to specification of column, level, and frame numbers, a SAR produces bitmap image data of the specified image.

Note that the SAR identifies cassettes by their location in its holding apparatus, not by a unique cassette identifier. A user of the device could load any cassette into any holding location. A means external to the SAR is needed to keep track of which cassette is loaded in which location in which SAR. As described in section IV below, the Image System Data Base 380, maintained in the computer 110, is part of such a mechanism.

Optical disk storage subsystems include both optical disk jukeboxes 184 (such as Series 1800 Expandable Jukebox sold by Cygnet Systems, Inc.) and stand-alone optical disk drives 186 (such as model LD-1200-102 sold by Optical Storage International). A stand-alone optical disk drive uses a single optical disk, which is changed manually. Similar to a SAR, an optical disk jukebox includes one or more optical disk drives, retrieval apparatus, and apparatus for holding a large number of optical disks (approximately 90).

The playback apparatus of an optical disk drive differs significantly from the scanner of a SAR, because image data is stored digitally on an optical disk, unlike a SAR which stores the image in analog form. Image data is stored on the optical disk in compressed form. (The image data could be stored in uncompressed form, but this would make inefficient use of storage space.) Thus, the image data from an optical disk need not be processed in order to be compressed. Another ramification of this difference in storage form, is that the data can be organized as a collection of data files in much the same way files are organized on magnetic disk systems.

The optical disks are of the write-once variety. Thus, the optical disk storage subsystems can be used to write data. This differs from SARs which only store and retrieve data, and where a camera system 190 is used to place images on the microfilm. To obtain the image data from a paper document for storage on an optical disk, a document scanner 192 is used to optically scan paper documents.

The SARs and optical disk storage subsystems are connected to the ITCs 172 and 174. A relatively low cost system with only a modest amount of image storage can be configured by using only stand-alone optical disk drives and connecting them directly to a SCSI IOP of the computer 110.

Figure 5:
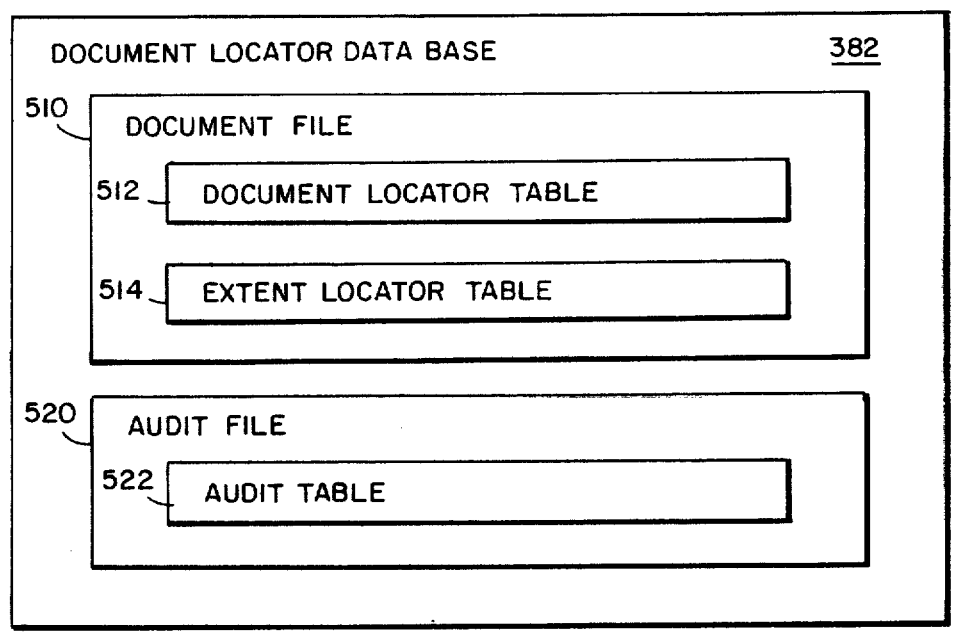
FIG. 5 shows the tables and files in the Document Locator Data Base.

The camera subsystem 190 is connected to a workstation 130 so that a user can coordinate the filming of documents with the creation of records for a Document Locator Data Base 382. (See FIG. 5 and a subsection IV.B for more description of the Document Locator Data Base 382.)

The document scanner 192 is also connected to a workstation 130 (which need not be the same workstation to which the camera subsystem 190 is connected). In addition to coordinating the scanning of documents with the creation of records for a Document Locator Data Base 382, the workstation 130 receives from the scanner 192 the image data created by the scanning process, and the workstation converts this to compressed form. Alternatively, a scanner could be arranged to do the compression itself.

An optical character recognizer (OCR) 194 (such as sold by Palantir) is connected to a workstation 132. This OCR unit includes a document scanning mechanism and character recognition apparatus. The OCR 194 can be used to convert to text form all or portions of the text on a document page. The page can be scanned by the OCR's scanner. However, if the image is already available in digital form (e.g., from scanning on the document scanner 192 or from a SAR 180 or 182) this image data can be sent through the computer 110 and the workstation 132 to the OCR 194; thus, the character recognizer of the OCR can be used to convert previously stored images to text completely under computer control.

The ability to apply character recognition to stored images can be used to aid in the construction of document data bases. The full text of the documents can be recognized and can be used to build a words-in-text index that can be used to identify documents based on the words they contain. Selective character recognition or intelligent selection from full recognition can be used to extract such information as document type, author, recipients, and title. Because the character recognition is available to the computer 110 to be applied to any stored document images, the computer 110 can be programmed to perform such character recognition and data base building automatically as a background task or at night when there is little other computer use.

U.S. patent application Ser. No. 880,409, filed Jun. 30, 1986, and titled DIGITAL IMAGING FILE PROCESSING SYSTEM, describes a system using selective character recognition to build a document data base.

A telecopier gateway 196 is connected between a telephone line 198 and the serial IOP 124 of the computer 110. The telecopier gateway can dial telephone calls, receive telephone calls, and can transmit and receive document images according to standard facsimile protocols. The telecopier gateway differs from a standard facsimile machine in that it has no scanner or printer; instead it gets document images in digital form via the computer 110, and it stores and/or prints the received documents via the computer 110. The telecopier gateway 196 can also receive from the computer 110 documents in text form and convert these to image form for telecopy transmission. Thus, users of the office automation/image management system can use their workstations and the office automation tools to interact with others via facsimile.

A laser printer 150 is connected via the IOP 124 to the computer 110. This printer can print both images and text; in fact, in conjunction with the image/integrated word processing application, the laser printer can print text documents that include embedded images.

Camera subsystems, document scanners, and optical character recognizers can alternatively be arranged to be directly connected to IOPs of the computer 110. Likewise, printers and other peripherals can be arranged to directly connect to workstations.

I.D. ITC Hardware

Figure 2:
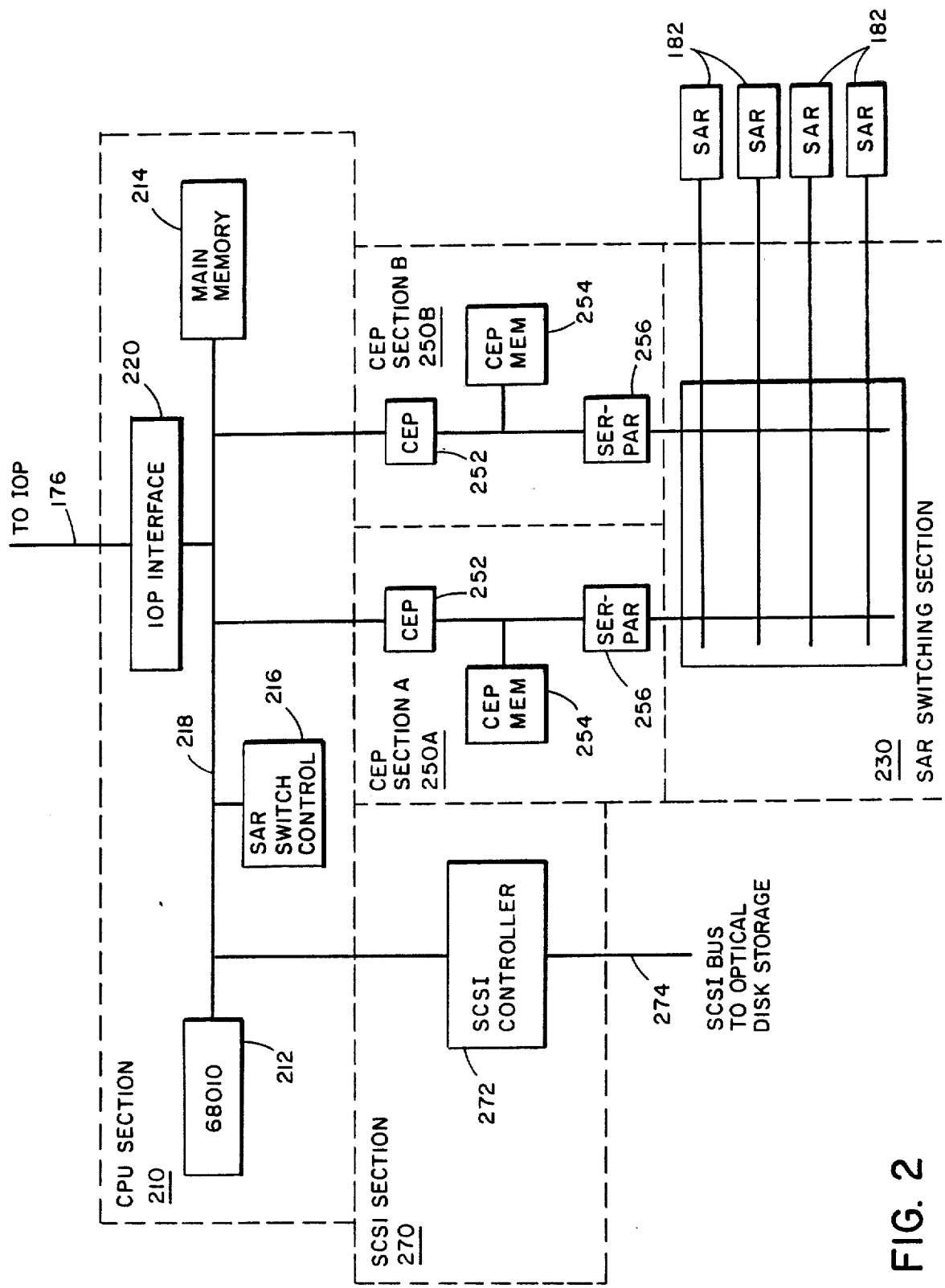
FIG. 2 is a block diagram showing hardware components of an image transfer controller (ITC).

FIG. 2 shows the hardware architecture an image transfer controller (ITC), such at ITCs 172 and 174 in FIG. 1. The ITC has a CPU section and a selection of optional sections. The optional sections are selected from (1) SAR switching section 230, (2) CEP section 250 (two CEP sections are shown in FIG. 2; they are labeled 250A and 250B), and (3) SCSI section 270 (Small Computer Standard Interface).

The CPU section 210 provides the overall control of the ITC. The primary components of the CPU section 210 are a processor 212 (Motorola 68010), main memory 214, SAR switching control 216, main bus 218, and an IOP interface 220. The CPU section 210 also includes bus arbitration logic, an RS-232C serial port for use by service personnel, an other miscellaneous circuitry.

The main memory 214 includes a ROM with power up diagnostics and firmware to perform an IPL (Initial Program Load) via the interface to the ITC IOP 170 in the computer 110. The memory 214 also includes 128 Kbytes of high speed static RAM and 2 Mbytes of slower dynamic RAM. The faster memory is for program, stack, and vector table storage; the slower memory is for storing image data.

The IOP interface 220 connects to the ITC bus 176, a high speed (about 13.5 Mbytes/second raw transfer rate) parallel bus by which ITCs connect to the ITC IOP 170. The IOP interface 220 also includes dual channel direct memory access to the main memory 214.

The SAR switch control 216 is the circuitry by which the CPU section communicates with whatever optional SAR switching sections 230 may be present in the ITC. This enables the processor 212 to control the switch connections (thereby controlling the connection of SAR serial data streams to CEP sections) and to send commands to the SARs 182. Each SAR 182 has a high speed serial data port and a low speed serial control port.

Each SAR switching section 230 includes a switching matrix by which four serial data connections to SARs 182 can be routed to any of 16 serial lines that connect to the CEP sections 250. Thus, the data from a SAR can be routed to any of 16 CEP sections 250 that may be installed in the ITC. More than one SAR switching section 230 can be installed in an ITC, thereby providing connection to more than four SARs. Each SAR switching section 230 also includes four serial ports that are used to connect to the control ports on the SARs.

The primary component of each CEP section 250 is a compression/expansion processor 252 (CEP) AMD AM7971) for executing one of several image data compression algorithms to convert image data from uncompressed bitmap form to one of several compressed forms. The CEP 252 receives its input data from CEP memory 254 and writes its output (using direct memory access) into the main memory 214. The CEP memory 254 is large enough (1 Mbyte) to contain two images; thus, the CEP 252 can be converting one image while another is being loaded into its memory. The image data is loaded into the CEP memory 254 by serial-parallel/DMA circuitry 256, which receives serial data from one of the SARs 182 via the SAR switching section 230.

Because the time it takes a CEP 252 to compress an image (roughly 1 second) is a significant factor in retrieval time performance, and ITC will be configured to include a number of CEP sections that is matched to the volume of image traffic from SARs (as images are stored on optical disks in compressed form, image retrieval from optical disks does not involve compression processing) that the ITC is expected to handle.

The SCSI section 270 provides a connection to the industry standard parallel bus interface known as the Small Computer Standard Interface. This interface is used to connect to optical disk drives and jukeboxes. The SCSI section 270 includes a SCSI controller 272 (NCR 5385/6). On one side, the SCSI controller 272 has direct memory access to the main memory 214, and on the other side connects to the SCSI bus 274.

II. System Structure - Software

II.A. Overall Software Structure

Figure 3:
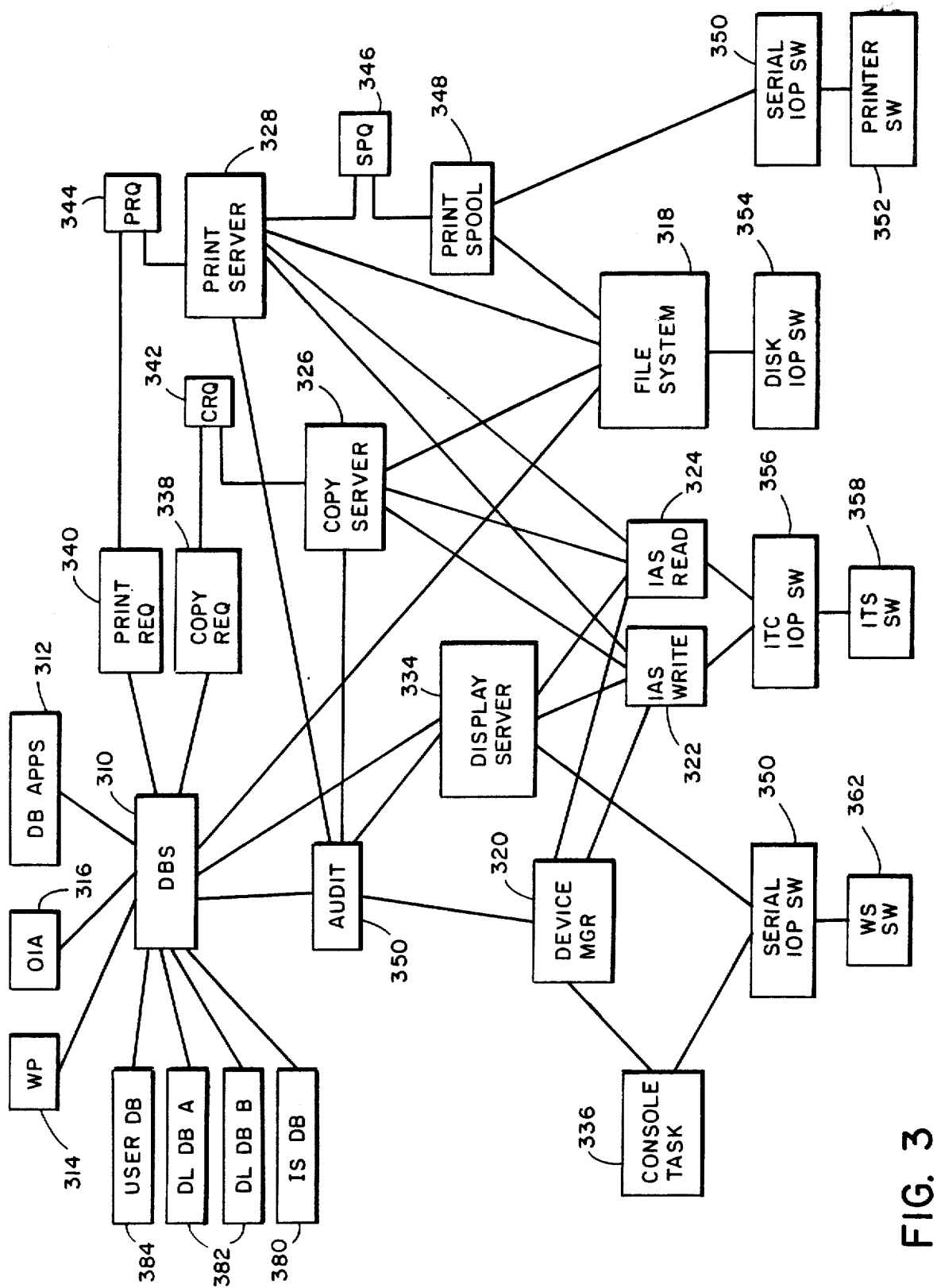
FIG. 3 is a block diagram showing relationships among software components of an office automation system, with particular emphasis on the components related to image access.

The overall structure of the software will be described with reference to FIG. 3, which shows relationships among software components of the illustrative office automation system. Components and relationships useful in understanding the present invention are shown; those skilled in the art will appreciate that other components and relationships also exist.

Associated with the minicomputer 110 operating system software, which provides an environment for other software. This environment includes virtual memory, multiple concurrent tasks, system calls (by which conventional operating system services such as file management 318 can be accessed), support for shared subroutine libraries, and an IPC system (InterProcess Communication—a message system by which separate tasks can communicate).

Data Base System

A relational data base system 310 provides numerous tools for building data base applications 312 (such as accounting systems and personnel data bases) and provides services to support the running of these as well as other independently developed applications (e.g., word processing application 314, office integration application 316). The present illustrative office automation system uses PACE (Professional Application Creation Environment, Wang Laboratories, Inc.) as the data base system 310. PACE is described in *VS Introduction to the Professional Application Creation Environment (PACE)*, Wang Laboratories, Inc. An interface is provided by which a program written in a high level language such as COBOL or PL/I can obtain access to the operations supported by the data base system 310, including image display, image print, and image copy operations.

The data base system 310 provides for fields to be defined to be of type "image document". This is a nonstructured field; in other words, it does not itself contain the actual data, but rather contains a reference to the data which is physically stored outside of the data base. In many ways this field is treated similarly to a text field of 20 characters. The character string stored in this field is a logical document identifier for the image document to which the field refers. An image document may be a single image or it may be a plurality of images.

The data base system 310 uses various user data bases 384, an Image System Data Base 380 (see subsection IV.C), and a plurality of Document Locator Data Bases 382 (see subsection IV.B). As will be seen, various of the software components manipulate these data bases (by means of the data base system 310). In addition, various of the data base applications 312 provide means by which users of the system can manipulate these data bases.

The office integration application 316 ties together other office automation applications and provides support for groups of workers to coordinate their work by providing coordinated calendaring and electronic mail. An example of such an application is Wang OFFICE (Wang Laboratories, Inc.). An example of a word processing application is WP Plus (Wang Laboratories, Inc.).

Image Device Manager Task

A software component with a central role in image access is the Image Device Manager Task 320. Only four of the interactions of the Device Manager 320 with other software components are directly shown in FIG. 3. Additional interactions are described below, particularly in this subsection II.A and in section III.

The Device Manager Task 320 is started at IPL time (Initial Program Load, i.e., when the system is "booted"). Upon being started, the Device Manager Task 320 performs various initialization operations such as:

- check the integrity of certain files (e.g., data base files used by the Device Manager) and perform soft-crash recovery if needed,
- determine the physical configuration of the system (e.g., the locations of ITCs and the device numbers assigned to each of them),
- start the Image Access Write Task 322 and the Image Access Read Task 324,
- open some files (e.g., ITC File, Unit File, Media File, image system error log file) (see section IV.C for discussion of the Image System Data Base Files),
- attempt to match physical ITC status with the ITC status indicated by the ITC Locator,
- attempt to match physical unit status with the unit status indicated by the Unit Locator, and
- start the Audit Task 330, the Image Print Server Task 328, and the Image Copy Server Task 326.

After the Device Manager's initialization procedures are completed, the Device Manager 320 waits for the receipt (via IPC messages) of requests from other tasks. Requests received mainly from the Image Operator Console Task 336 include:

- attach, detach, enable, or inhibit an ITC,
- attach, detach, enable, or inhibit a unit (e.g., a SCSI section of an ITC),
- attach, detach, enable, or inhibit a sub-unit (e.g., an optical disk jukebox),
- prepare a SAR for loading or unloading of a microfilm cassette, and
- enable or disable the logging action of the Audit Task 330.

"Attach" implies more than mere physical attachment: it means that the software has been arranged to make the device accessible; a storage device may be physically connected and turned on, and still not have been made available, an action taken by the system administrator. "Inhibiting" a device means limiting access to a particular user ID; for example, the image system administrator can inhibit a device in preparation for changing the arrangement of cassettes in a SAR.

The Image Device Manager 320 also manages the Image Copy Request Queue 342 (CRQ) and the Image Print Request Queue 344 (PRQ), about which it communicates with the Image Copy Request Task 338, Image Print Requester Task 340, the Image Copy Server Task 326, and the Image Print Server Task 328. The use of these queues is described further in subsection III.A. Note that one of the ways that FIG. 3 is simplified is that it shows the logical connection of the Queues 342 and 344 to the Servers 326 and 328, and omits showing the intermediate role of the Device Manager 320.

Image Operator's Console Task

The Image Operator's Console Task 336 is started at a user's request. Its purpose is to communicate user requests to the Image Device Manager Task. The Console Task 336 provides the interface through which a user can reconfigure image system devices, such as:

- enable or inhibit all image access functions,
- attach or detach ITCs or individual devices attached to ITCs, and
- set SARs so that a user can load or unload a microfilm cassette.

The Console Task 336 also provides the interface through which a user can manage the Image Copy Request Queue 342 and the Image Print Request Queue 344.

The Console Task 336 communicates with the user via software 350 in the serial IOP 124 and software 362 in the workstation itself (e.g., 126 or 128).

Audit Task

The Audit Task 330 is a background task started by the Device Manager Task 320. The purpose of the Audit Task 330 is to maintain information relating to image accesses, in particular, access counts and last date of access for each media item (e.g., for each cassette) and a log with an entry for each image access request.

Figure 6:
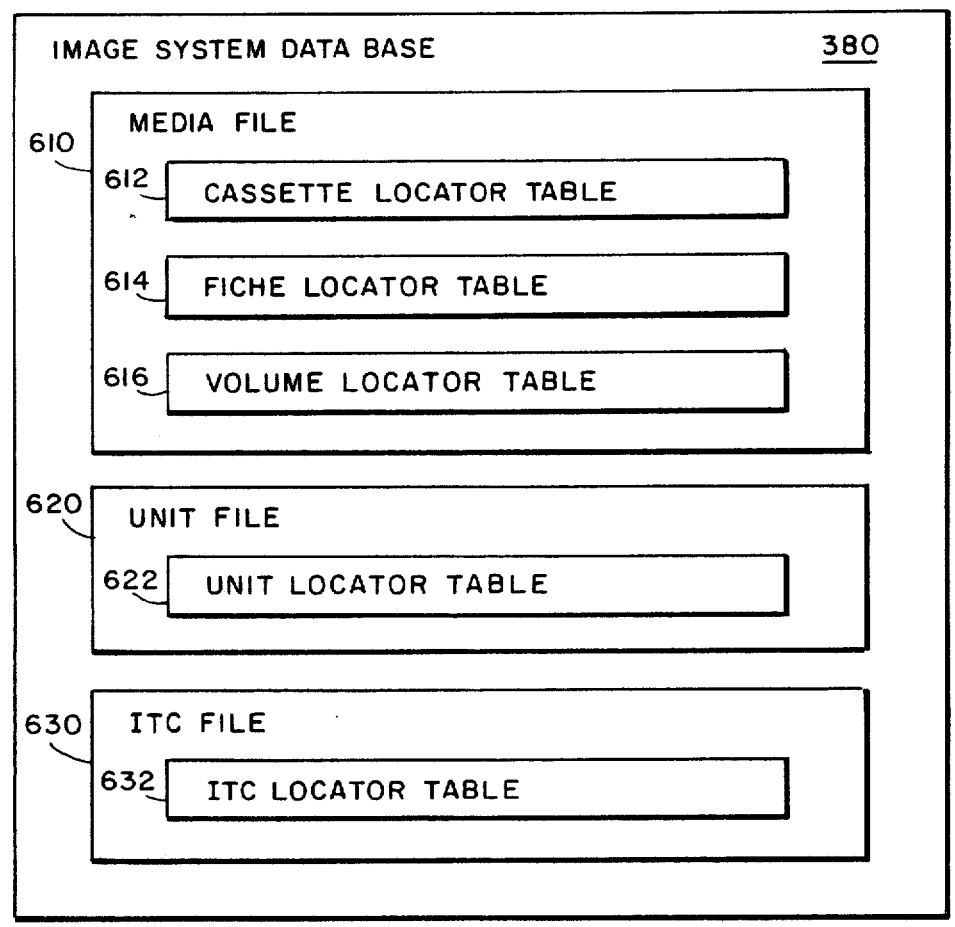
FIG. 6 shows the tables and files in the Image System Data Base.

The Media File 610 (FIG. 6) in the Image System Data Base 380 includes a record for each media item and these records include the following fields: Number of Accesses, Data Last Accessed. These fields are updated by the Audit Task 330.

Each Document Locator Data Base 382 (see subsection IV.B) includes an Audit Table 522. When an image access request (e.g., display, print, copy) is made, the Audit Task 330 (when enabled) adds a record to the Audit Table 522 of the Document Locator Data Base 382 used in making the access request.

The Audit Task 330 receives the needed information via IPC messages sent to it by the Image Display Server 334, the Image Copy Server 326, and the Image Print Server 328. The logging action of the Audit Task 330 can be turned OFF and ON via the Image Operator's Console Task (which operates via the Device Manager 320).

Image Access Server

Image Access Server consists of two tasks: the IAS Write Task 322 and the IAS Read Task 334. The IAS Write Task 322 passes image access requests from the Display, Copy, and Print Servers 334, 326, and 328, respectively, to the ITCs; the IAS Read Task 324 passes the results of the requests back from the ITCs to the Servers. To accomplish this, the IAS Write and Read Tasks interact with the ITC IOP 170, which is running ITC IOP software 356. The IOP passes the requests to the appropriate ITC, where the request is handled by the ITC software 358 (shown in greater detail in FIG. 4).

Image Display Server

The Image Display Server 334 is available in a shared subroutine library. It is called by the data base system 310 in order to perform image display operations. The Display Server 334 does the following:
- performs data base operations to determine the physical locations of the requested images,
- requests the image data by sending an IPC message to the IAS Write Task 322,
- receives the image data via a pointer in an IPC message from the IAS Read Task 324, and
- sends the image data via the serial IOP software 350 to the workstation (e.g., 128) where workstation software 362 handles conversion from compressed form and display of the image.

Image Copy and Print-Requesters, Queues, Servers

The Image Copy Requester 338 and the Image Print Requester 340 are available in a shared subroutine library. They are called by the data base system 310 in order to perform image copy or print operations, respectively. When called, the Requester passes on the copy or print request to the Device Manager 320, which places the request on the appropriate queue (either the Copy Request Queue 342 (CRQ) or the Print Request Queue 344 (PRQ)) and then the Requester returns to the calling program; unlike display operations, copy and print operations are accomplished in the background.

Image Copy Server 326 and Image Print Server 328 are background tasks. They receive input from the Image Copy Request Queue 342 and the Image Print Request Queue 344, respectively. These Servers pass image access requests to the IAS Write Task 322 and receive image data from the IAS Read Task 324 in much the same manner as does the Display Server 334.

Upon receiving image data, the Image Copy Server 326 puts the data into the format used for digital storage of image documents and interacts with the file system 318 (which accesses the disk storage units 122 via software 354 in the disk IOP 120) to have this data stored in a disk file. When storing images in digital form, as is the case for magnetic disk storage and for optical disk storage, images are stored as one "image document" per file (and thus, typically, a plurality of images per file). U.S. Pat. No. 4,553,206 titled IMAGE STORAGE AND RETRIEVAL describes a format for storing image documents in files.

Upon receiving image data, the Image Print Server 328 puts the data into a temporary print file and places a print request on the System Print Queue 346, which is the general purpose mechanism for printing. The System Print Spooler Task 348 passes the data to be printed via software 350 in the serial IOP 124 to the laser printer 150, which has software 352 that handles the printing of image data.

II.B ITC Software

Figure 4:
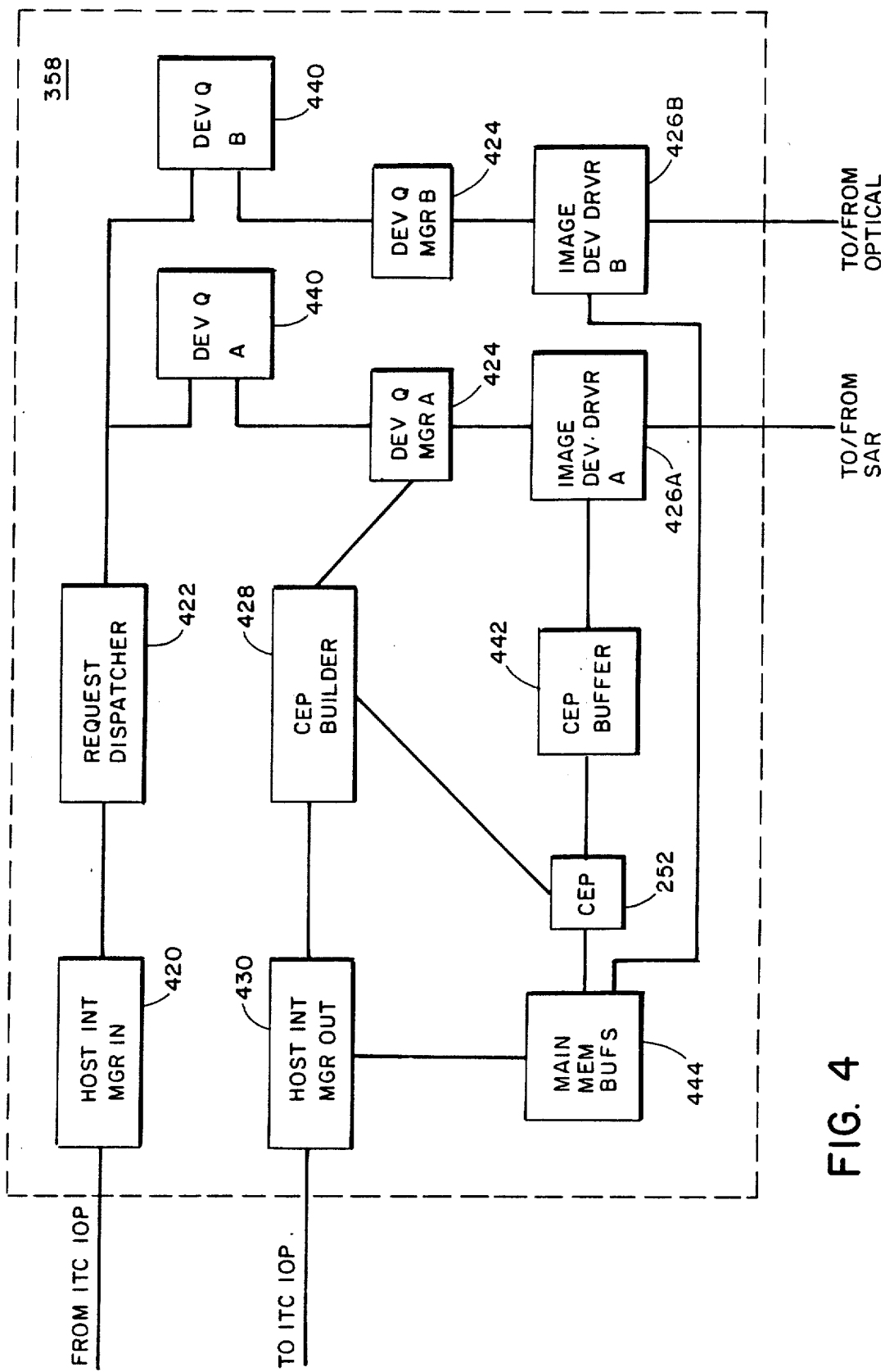
FIG. 4 is a block diagram showing relationships among components of the ITC software.

FIG. 4 summarizes the relationships among the major components of the software 358 in the ITCs (e.g., 172, 174). The following tasks run in the ITC:
- the Host Interface Manager IN 420,
- the Request Dispatcher 422,
- the Device Queue Managers 424,
- the Image Device Drivers 426,
- the CEP Builder 428, and
- the Host Interface Manager OUT 430.

There is a Device Queue Manager 424, and Image Device Driver 426, and a Device Queue 440 for each attached SAR 182 and for each SCSI section 270. Device Queue Managers 424 and Image Device Drivers 426 are loaded as part of the process of "attaching" a device.

Image Device Drivers 426A pass the data received from SARs to CEP Buffers 442 located in CEP memory 254. The CEP 252 passes image data it has processed to buffers 444 located in the main memory 214 of the ITC's CPU section 210.

Image Device Drivers 426B pass data received from optical disk storage units directly to the buffers 444 in the main memory 214.

The CEP Builder 428 manages the use of the CEP sections 250.

II.C. Workstation Software

Some workstations are image-capable, some are not (e.g., due to lack of an adequate display screen). Those that are not image capable can still be used for various image-related functions, for example for administrative functions that do not require image viewing and for initiating copy and print image access operations.

The workstation software 362 that runs in an image-capable workstation supports four "channels" (i.e., provides four virtual terminals) each of which is associated with a task running in the computer 110. (Some workstations that are not image capable also provide this four channel support.) The software 362 provides image capable workstations with the ability to display an image window. Whenever present on the display, the image window is associated with one of the other windows.

The primary image operations managed by the workstation software 362 are receiving image data (in compressed form), decompressing the image data, and displaying the image data in an image window on the workstation's screen. Conversion of image data from compressed form can be accomplished in software, but to improve performance image workstations are equipped with compression/expansion processing hardware.

Control of the location, size, etc. of the image window is handled locally at the workstation by the workstation software 362. Other image operations supported include rotating, flipping, magnifying, and reducing image size. Image size can be reduced either by decimation (faster) or by averaging (better quality). International Patent Application serial number PCT/US86/01365, filed Jun. 26, 1986, titled RESOLUTION CONVERSION OF BITMAP IMAGES USING ERROR TERM AVERAGING, describes a technique for converting the resolution of images using averaging.

III Steps in Accessing an Image Document

First, the steps in one particular type of image access are discussed. Then in subsection III.B variations are discussed.

III.A. Image Access - One Example

The following describes display from a data base application of an image document stored on microfilm in a SAR.

1. A field of type "image document" is created in a data base and records are created with logical image document identifiers stored in that field.

2. A user performs a data base access, the result of which is a record which has a field of type "image document". The user then presses the DISPLAY IMAGE key in order to view the image(s) to which the field refers.

3. The logical document identifier is obtained from the field in the data base, and the Image Display Server 334 is called (and the 20 character string that is the logical document identifier is passed to it). There will be a separate instance of the Display Driver 334 running for each data base application 312 requesting display of an image document.

4. The Image Display Server 334 used the logical document identifier and the various locator data bases to determine the physical address specifications of the requested image document. This is the "document mapping" process (see section IV.D for more details). In summary, the Display Server 334 applies the logical document identifier as a key to the Document Data Base 382 to obtain records that identify the cassettes or disks on which the images of the image document are stored. The identifiers for the cassettes or disks are then applied to the Image System Data Base 380 to determine the physical device in which the medium is loaded, and where within the device it is located. Thus, a logical image document identifier is converted to physical address specifications for the images in the image document. This information is stored in a list of Media Parameter Blocks each of which includes the physical address (including, e.g., unit #, level #, frame #) of an extent of the image document. The Image Display Server 334 also creates an IASPB (Image Access Server Parameter Block), which includes a pointer to the list of Media Parameter Blocks.

5. If it has not already done so, the display Server 334 establishes an IPC session with the IAS Write Tasl 322 and an IPC session with the IAS Read Task 324. The session is set up when the data base application 312 first makes an image services request. The session will last until the application closes its use of the shared subreoutine library in which the Display Server is present (this will happen when the user exits the application if it has not happened earlier).

6. The Display Server makes a request (via IPC message) of the Image Access Server (IAS) to get one or more pages of an image extent, passing the IASPB.

7. The appropriate information in the IASPB is converted into an XIO Write command which is issued to the device #(i.e., 1-3) on the ITC IOP 170 with which the appropriate ITC is associated. The IAS Write Task may combine a plurality of requests in a single XIO Write command, because up to 16 Kbytes can be included in a single transfer across the ITC bus 176.

8. The ITC IOP 170 sends the image extent request to the ITC.

9. The request is queued on the ITC:
 9.1. For each request, the Host Interface Manager IN 420 builds an Image Access Request Block (IARB).
 9.2. The IARB is passed to Request Dispatcher 422, which places the IARB on the Device Queue 440 of the appropriate Device Queue Manager 424.
 9.3. The Device Queue Manager 424 organizes IARBs so as to minimize mechanical access time.
 9.4. Each IARB is sent by the Device Queue Manager 424 to the associated Image Device Driver 426.

10. The Image Device Driver 426 manipulates the appropriate storage device to retrieve the requested image data. For microfilm located in a SAR (in which case the image is stored in analog form), then:
 10.1. The ITC sends instructions to the specified SAR to load the specified microfilm cassette into the SAR's scanner and advance the film to the specified frame.
 10.2. The SAR's scanner converts the image to digital form (this is raw image data in bitmap form) and sends this as a serial stream to the ITC.
 10.3. The uncompressed image data is passed to the memory 254 of a compression processor section 250 in the ITC; each compression processor section has enough memory to buffer two images and thus is double-buffered, meaning it can be compressing one image while the next image is being loaded into its memory. The data transfer from the SAR to the compression processor is accommmplished by means of the SAR switching section 230 and serial-to-parallel conversion/DMA circuitry 256.
 10.4. The compression processor 252 converts the image data to compressed form and simultaneously places this data in the main memory 214 of the ITC's CPU section 210. This is managed by the CEP Builder 428.
 10.5. The CEP Builder 428 notifies the Host Interface Manager OUT 430 whenever another 16 Kbytes of compressed image is ready to be sent to the computer 110.
 10.6. The Host Interface Manager OUT 430 sends blocks of compressed image data to the ITC IOP device #0. This image data is in a format that is independent of the storage medium from which the image was retrieved.

11. The IAS Read Task 324 issues an XIO Read command to device #0 on the ITC whenever the IAS Read Task 324 is not doing anything else. Thus, the IAS Read Task reads messages from the ITC which contain the image data. This involves the IOP transferring the message (including the image data) into main memory of the computer 110. Each message includes an identification of the task requesting the image data.

12. The IAS Read Task 324 forms and send an IPC message to the task that requested the image data (i.e., the data base application 312 that, via its instance of the Display Server 334, requested the image data). The message indicates the location of the image data in main memory of computer 110.

13. The Display Server 334 recieves the blocks of image data from the IAS Read Task 324. There will be a plurality of messages for each image because the size of a message across the ITC bus 176 is limited to 16 Kbytes.

14. The Display Server 334 requests the workstation software 362 to open an image widow in the workstation.

15. The Display Server 334 writes the image data to the workstation: the Display Server directs the Workstation IOP to transfer the image data from the main memory of the computer 110 to workstation memory.

16. The workstation (using its compression/expansion processor) decompresses the data into raw bitmap form as it transfers the image data to the display buffer.

17. The user can, using capabilities fo the local workstation user interface, adjust the windows (e.g., move, resize) and control which window is current (i.e., on top and receiving input from the keyboard).

18. The Display Server 334 requests the workstation software 362 to close the image window. This action is taken in response to an indication by the user via the application 312 that the user is done viewing the image document. In addition to being able to explicitly close the window, the user can implicitly close the window by exiting the application that opened the window, or by viewing an image document from another application.

III.B. Image Access - Variations

The preceding subsection III.A describes the image access process for the case of display from a data base application of an image document stored on microfilm in a SAR. This subsection discusses how the process differs in lother image access situations (e.g., for other types of image access operations, for other storage media). The step numbers referred to below are step numbers from the subsection III.A.

The image copy operation copies all or part of an image document to a file on a magnetic disk or on an optical disk. A copy operation can optionally update a Document Locator Data Base 382, so that the copied document can be accessed by reference to a logical document identifier.

The step 4 described above for the display operation differs somewhat for copy operations:

a. The data base applications 312 requesting an image copy operation call the Image Copy Requester 338, which then does the following:
  i. The Copy Requester 338 performs one level of mapping, i.e., it converts a logical document indentifier into a Logical Document Address (see section IV below).
  ii. The Copy Requester 338 sends an IPC message to the Device Manager Task 320, which then places a request on the Image Copy Request Queue 342.
  iii. The Copy Requester 338 sends an IPC message to the Audit Task 330, which adds a record to the Audit Table 522 in the Document Locator Data Base 382 associated with the application 312.
  iv. If requested, the Copy Requester 338 creates a record for the soon-to-be-created image document in the Document Locator Table 512 in the Document Locator Data Base 382. The entry is created at this time (rather than waiting until after the image document has been created) to avoid the possible creation of duplicate document identifiers.

b. When there is a request pending on the Image Copy Request Queue 342 and the Image Copy Server 326 is not busy, the Image Device Manager 320 dispatches the Copy Server 326 to perform the next queue copy operation, which is accomplished as follows:
  i. The Image Copy Server 326 performs the remaining mapping steps (using the Image System Data Base 380) to determine the physical location of the requested image document (the Copy Requester 338 performed initial mapping steps prior to enqueuing the copy request).
  ii. The Image Copy Server 326 then reads the image data (via the IAS Write Task 322 and the IAS Read Task 324, as is done by the Display Server 334 for a display operation) and writes it to the specified file (via the file system 318 for magnetic disk files, and via the IAS Write Task 322 for optical disk files).
  iii. If an error is detected, the Image Copy Server 326 removes the entry created in the Document Locator Data Base 382.
  iv. If an error is detected, the Image Copy Server 326 notifies the Device Manager 320 of the problem.
  v. If the read operation is successful, the Image Copy Server 326 sends a message to the Audit Task 330 to update the Number of Accesses and Date Last Accessed in the appropriate record in the Media File 610.
  vi. Finally, the Image Copy Server 326 sends a message to the Device Manager Task 320 notifying it that the Copy Server 326 is finished.

Print operations are performed in a manner similar to copy operations (using Image Print Requester 340, Image Print Request Queue 344, and Image Print Server 328). However, after storing the resulting image data in a temporary file, the Print Server 328 places a request on the System Print Queue 346. The System Print Spooler Task 348 monitors the System Print Queue 346 and handles transferring the print data to the appropriate printing device. The System Print Queue 346 and System Print Spooler Task are used for all types of printing request, not just requests to print images.

As discussed above, when a user makes a copy or print request, the request is queued, and then the user continues with other operations. This contrasts with display request, which are handled directly (rather than through a queue), so that the user can see the requested image before the user continues with another operation.

Regarding steps 1 and 2, the data base system 310, the word processing application 314, and the office integration application 316 all recognize an "image document" data object type, Therefore, users of applications 314 and 316, like users of data base applications 312 may have occasion to view image documents:

a. A user of the office integration application 316 can receive a package that includes an image document. The user can then press the DISPLAY IMAGE key in order to view the image document in the package.

b. Images can be incorporated into documents produced using the word processing application 314. When using the word processing application 314, a user can view a document including a contained image by pressing the VIEW key.

Regarding step 3, documents prepared using the word processing application 314 and mail packages prepared using the office integration application 316 can include logical image document identifiers or can refer directly to files containing image documents.

Regarding step 4, the word processing application 314 and the office integration application 316 use the high level language interface to the data base system 310 in order to perform image access operations. To display an image as a part of a word processing document, the word processing application 314 calls the data base system 310 to retrieve the image data, and then the applicatin 314 handles actual display of the image data on the user's workstation. The office intergration application 316 has less demanding display requirements; thus, the application 316 calls the data base system 310, which handles both retrieval and display on the workstation of the image data in the same manner as for data base applications 312. Thus, although applications 314 and 316 could use their own display servers of different design (different from the Display Server 334), the additional design work can be avoided by operating through the data base system 310 and using the Display Server 334. Even if an application needed a different display server, that display server can still use the Image Access Services (IAS Write Task 322 and IAS Read Task 324) to communicate with the image storage devices.

If an image to be retrieved is stored on one of the bulk image storage devices (e.g., optical disk, microfilm, microfiche), then the Display Server 334, Copy Server 326, or Print Server 328 uses the Image Access Server (IAS Write Task 322 and IAS Read Task 324) to retrieve the image, as discussed above. However, if the image is stored on magnetic disk (which is less well suited to storing large numbers of images than are bulk image storage media such as microfilm and optical disk storage systems), the Display Server 334 uses the file system 318 to retrieve the image data.

Regarding step 10, if the medium is an optical disk, then the operation that the Image Device Driver 426B needs to perform is essentially a file read (with the added complexity of loading the appropriate disk if a jukebox is used); as the image is stored in compressed digital form, no image data compression operation need be perfomed.

III.C. Compression/Expansion of Image Data

When stored in digital form (as on magnetic or optical disks), image data is stored in compressed form. The data resulting from scanning (e.g., from paper or from microfilm) is immediately compressed. Devices that print or display images are arranged to receive image data in compressed form and these devices then expand the data in order to create a viewable image. Thus, all image data passing through the computer 110 and over the various communication lines and buses does so in compressed form. This practice (compressing at the source and only expanding for view) contributes to the speed with which image access operation can be performed.

Various compression techniques can be used, such as those standardized by the CCITT (Group 3 and Group 4 methods for facsimile data compression) and that described in U.S. Pat. No. 4,631,521, titled DIFFERENTIAL RUN-LENGTH CODING FOR DITHERED IMAGES. Compression factors of roughly 10:1 can be achieved.

IV. Document Mapping

The data base system 310 is used to implement a document mapping process that maps a logically defined image document to physically stored images and to the physical location in storage devices of the stored images.

The document mapping process uses one of a plurality of Document Locator Data Bases 382 and the Image System Data Base 380. A typical system will have a plurality of Document Locator Data Bases 382, but in a simple situation only a single Document Locator Data Base 382 may be needed; in either case, only a single Image System Data Base 380 is used.

Each Document Locator Data Base 382 can provide a different set of logical document identifiers, and these can map to the same or different combinations of images. A data base application 312 associates itself with one of the Document Locator Data Bases 382; when that application requests an image access function, the associated Document Locator Data Base is used in the document mapping process.

An image document consists of one or more "extents". An extent is a series of images stored contiguously on the storage medium. For a document stored on microfilm, an extent corresponds to a strip of film. A typical document will consist of a single extent. However, if a document is later changed (e.g., by the addition, deletion, or reordering of pages), it will likely be stored as a series of extents. Each of the various extents that make up an image document may be stored on a different medium; this is another illustration of how an image document is defined logically and is storage medium independent.

A Logical Extent Address identifies the particular cassette, fiche, or file on which an extent is stored, and specifies where on that medium the images of the extent are located. A Logical Document Address for an image document is a list of one or more Logical Extent Addresses (one for each of the extents that make up the image document). A Physical Device Address specifies all the information needed to actually read image data, including the device in which the medium (e.g., cassette, fiche, platter) is loaded, wherein the device the medium is located , and what portion of the medium (e.g., frame numbers) includes the relevant images.

IV.A. Data Base Terminology

The present invention employs a relational data base system 310, which is an engine for manipulating data bases. The data base system 310 orgainzes data in a plurality of tables (as do relational data bases in general). A table is logically organized into rows and columns: each row is a record; each column is a field. Each record in a table logically includes data items for each of the fields defined for that table (although an item may be empty).

A data base includes both actual data as well as other information needed by the data base system (e.g., information defining the fields in the various tables, report formats). A data base is stored as a collection of files (i.e., via the file system 318); some of the files store the actual data and other fills store the other information. A file of actual data contains one or a plurality of tables; the choice depending upon performance and convenience considerations.

IV.B. Document Locator Data Base

A Document Locator Data Base 382 (FIG. 5) is used to convert (i.e., map) a logical document identifier to a Logical Document Address. Each Document Locator Data Base 382 includes a Document File 510 and an Audit File 520. The Document File includes two tables: a Document Locator Table 512, and an Extent Locator Table 514. The Audit File includes a single table: the Audit Table 522.

The Document Locator Table 512 includes the following fields:

| | |
|---|---|
| Image Document ID | the logical document identifier. |
| Extent Number | 0 |
| Media Type | for extent 0; microfilm, fiche, optical disk, or magnetic disk. |
| Number of Pages | total pages in all extents of the image document. |
| Number of Extents | the number of extents beyond the initial extent 0. |
| Creator User ID | ID of the document originator. |
| Creation Date | date document was created. |

-continued

| | |
|---|---|
| Retention Date | date until which the document should be retained. |
| Modifier User ID | last user to modify the document. |
| Data Last Modified | date document was last modified. |
| Protection Class | of the document. |
| Initial Address | the Logical Extent Address for the first document extent of the image document; the substructure of this field depends on the media type: microfilm address, fiche address, optical disk file specification, or magnetic disk file specification (see details below). |

The Extent Locator Table 514 includes the following fields:

| | |
|---|---|
| Image Document ID | the logical document identifier. |
| Extent Number | 1-99 (information about extent 0 is in the Document Locator Table). |
| Media Type | for the extent to which the record refers; microfilm, fiche, optical disk, or magnetic disk. |
| Extent Address | a Logical Extent Address for a document extent; the substructure of this field depends on the media type. |

The Initial Address field of the Document Locator Table, and the Extent Address field of the Extent Locator Table each contain a Logical Extent Address. The Logical Extent Address consists of a selection of fields that depends on the type of medium on which the extent is stored.

The Logical Extent Address for a document extent stored on microfilm includes the following fields:

| | |
|---|---|
| Cassette Number | |
| Start Frame Number | |
| Frame Length | number of frames in this extent. |
| Threshold | optical threshold at which the microfilm should be scanned. |

The Logical Extent Address for a document extent stored on microfiche includes the following fields:

| | |
|---|---|
| Fiche Number | |
| Start Frame Number | |
| Frame Length | number of frames in this extent. |
| Threshold | optical threshold at which the fiche should be scanned. |

The logical Extent Address for a document extent stored on optical or magnetic disk includes the following fields:

| |
|---|
| Volume |
| Library |
| File |

The Audit Table 522 includes the following fields:

| | |
|---|---|
| Entry Number | unique audit log sequence number. |
| Date | of the image access request. |
| Time | of the image access request. |
| Image Document ID | the logical document identifier. |
| User ID | of the user making the image access request. |
| Function | the image access function requested, e.g., |

-continued

| |
|---|
| display, copy, print. |

In order to access image documents, a data base application must associate itself with one of the Document Locator Data Bases 382.

IV.C. Image System Data Base

The Image System Data Base 380 (FIG. 6) is used to convert a Logical Document Address to a Physical Device Address. The Image System Data Base 380 includes a Media File 610, a Unit File 620, and an ITC FIle 630. The Media File includes a table for each type of bulk image storage media included in the system: a Cassette Locator Table 612, a Fiche Locator Table 614, and a Volume Locator Table 616. The Unit File includes a single table: the Unit Locator Table 622. The ITC File includes a single table: the ITC Locator Table 632.

The Cassette Locator Table 612 includes the following fields:

| | |
|---|---|
| Media Type | cassette. |
| Cassette Number | logical ID of the microfilm cassette. |
| Unit Number | ID number of SAR in which the cassette is located. |
| Column Number | column address within the SAR. |
| Level Number | level address within the SAR. |
| Number of Accesses | cumulative number of accesses to the cassette. |
| Date Last Accessed | date of last access to the cassette. |
| Status | of the cassette: not mounted, mounted, mounted exclusive. |
| User ID | if the status is "mounted exclusive", then this is the ID of the administrator reserving the cassette. |

The Fiche Locator Table 614 includes the following fields:

| | |
|---|---|
| Media Type | fiche. |
| Fiche Number | logical ID of the sheet of microfiche. |
| Unit Number | ID number of (removable) microfiche storage drum. |
| Tab Number | fiche address within the SAR, corresponds to the encoding on the metal tag attached to the edge of the fiche. |
| Number of Accesses | cumulative number of accesses to the fiche. |
| Date Last Accessed | date of last access to the fiche. |
| Status | of the fiche: not mounted, mounted, mounted exclusive. |
| User ID | if the status is "mounted exclusive", then this is the ID of the administrator reserving the fiche. |

The Volume Locator Table 616 includes the following fields:

| | |
|---|---|
| Media Type | optical disk. |
| Volume Name | name of the (removable) disk platter. |
| Unit Number | ID number of the optical disk drive or jukebox. |
| Position Number | slot address of the platter within the jukebox. |
| Number of Accesses | cumulative number of accesses to the volume. |
| Date Last Accessed | date of last access to the volume. |
| Status | of the volume: not mounted, mounted, mounted exclusive. |
| User ID | if the status is "mounted exclusive", then this is the ID of the administrator |

-continued reserving the volume.

The Unit Locator Table 622 includes the following fields:

| | |
|---|---|
| Unit Number | ID number of the storage unit. |
| Device Type | type of image storage device. |
| ITC Number | ID number of the ITC to which the device is connected. |
| Slot Number | slot number or board address to which the device is connected (within the ITC). |
| Port Number | on the board. |
| Status | of the unit: not mounted, mounted, mounted exclusive, mounted inhibited. |
| User ID | if the status is "mounted exclusive" or "mounted inhibited", then this is the ID of the administrator reserving the unit. |

The ITC Locator Table 632 includes the following fields:

| | |
|---|---|
| ITC Number | ID number of the ITC. |
| System Name | system name for the host computer to which the ITC is connected. |
| Device Number | device number assigned to the ITC on the host computer. |
| Status | of the ITC: not mounted, mounted, mounted exclusive, mounted inhibited. |
| User ID | if the status is "mounted exclusive" or "mounted inhibited", then this is the ID of the administrator reserving the ITC. |

IV.D. Mapping Steps

The process of location the images of an image document actually begins outside of the image management components of the system. This process starts with a user querying a data base (e.g., a personnel data base) that includes image fields (e.g., picture of employee). The image field contains a logical document identifier, which is the starting point of the document mapping process.

The following is a description of the steps involved in converting (i.e., mapping) a logical document identifier to a Physical Device Address. In the description of these steps, the underlined fields contain the information that is assembled to become a complete Physical Device Address. The document mapping process involves the following steps:

a. The logical document identifier and Extent Number 0 are applied to the Document Locator Table 512. The result is the Logical Extent Address of the first extent of the image document, and an indication of how many, if any, more extents make up the image document.

b. For each of the additional extents, the logical document identifier and successive Extent Numbers are applied to the Extent Locator Table 514. The result is the Logical Extent Addresses of the remaining extents.

The preceding steps provide the following information for each extent:

i. For extents stored on Microfilm:
 1. Media Type
 2. Cassette Number
 3. Start Frame Number
 4. Frame Length
 5. Threshold ii. For extents stored on Fiche
 1. Media Type
 2. Fiche Number
 3. Start Frame Number
 4. Frame Length
 5. Threshold iii. For extents stored on Magnetic or Optical Disk:
 1. Media Type
 2. Volume
 3. Library
 4. File The medium has been identified; next, the medium is located. Details depend somewhat on the media type. The following assumes the medium is microfilm.

c. Media Type is used to identify the appropriate media locator table. For microfilm, the Cassette Locator Table 612 is identified.

d. Cassette Number is applied to the Cassette Locator Table 612, Resulting in Unit Number, Column Number, Level Number.

e. Unit Number is applied to the Unit Locator Table 622, resulting in ITC Number, Slot Number, Port Number.

f. ITC Number is applied to the ITC Locator Table 632, resulting in VS Name, VS Device.

The resulting Physical Device Address for microfilm includes:

VS Name within a VS cluster or network.
 VS Device which is the relevant ITC.
 Slot Number of the ITC to which the storage unit is physically connected.
 Port Number of the ITC slot.
 Column Number in the storage unit.
 Level Number in the storage unit.
 Start Frame Number on the roll of microfilm.
 Frame Length on the roll of microfilm.
 Threshold for scanning the roll of microfilm.

The foregoing decription has been limited to a specific embodiment of the invention. Additional advantages and modifications will be apparent to those skilled in the art. The invention is, therefore, not limited to the specific details, representative apparatus, and illustrative example shown and described in this specification. Rather, it is the object of the appended claims to cover all such variations and modifications as come within the true spirit and scope of the invention.

What is claimed as new and desired to be secured by Letters Patent of the United States is:

1. In an image management system, means for retrieving image documents from a plurality of types of bulk image storage media comprising:
 (A) a relational data base system,
 (B) at least one document locator data base, each for use by the relational data base system for determining a media address from a logical document identifier, the media address identifying one of a plurality of different types of storage media,
 (C) an image system data base for use by the relational data base system for determining a physical device address from a media address, wherein the image system data base includes a table for each of a plurality of types of bulk image storage media, each such table including information about physical device addresses of the storage media of the type to which the table corresponds
whereby the physical device address of at least a portion of the image document identified by the logical document identifier can be determined.

2. Document retrieval means as in claim 1 wherein an image document can include a plurality of extents, and wherein at least one of the document locator data bases includes
   (a) a document locator table with one record for each image document and
   (b) an extent locator table with one record for at least each extent beyond the first extent of each image document.

3. Document retrieval means as in claim 2 further including means for associating an image scan threshold value with a media address and further including means for scanning that is responsive to said associated image scan threshold value.

4. Document retrieval means as in claim 2 wherein the document locator table includes a media address for the first extent of each document and the extent locator table includes a media address for each extent except those that are the first extent of a document.

5. An office automation system comprising:
   (A) a plurality of bulk image storage devices, at least two of which use different types of storage media,
   (B) means for defining image documents and associating with each image document a logical document identifier, where an image document is a logical group of stored images, said defining means being capable of including, in a single image document, images stored on the different types of media,
   (C) an image access subsystem for receiving a logical document identifier and for providing access to images, which are stored on said storage devices, of the image document associated with the received logical document identifier in a manner idependent of the type of medium on which each of the images is stored,
   (D) a word processing subsystem arranged to provide a logical document identifier to the image access subsystem and to display an image identified thereby as a part of a word processing document.
   (E) a data base subsystem providing a field data type of the type "image document" by which an image document can be associated with a data base record in such a way that the image document can be retrieved from said storage devices by providing the content of an "image document" field to the image access subsystem as a logical document identifier,
   (F) an electronic mail subsystem for delivering message packages including image documents retrieved from said storage devices by providing a logical document identifier to the image access subsystem.

6. A system as in claim 4 further comprising a character recognition subsystem arranged to receive image documents retrieved by the image access subsystem and to convert to text form portions of received images.

7. The system of claim 6 wherein the character recognition subsystem can be used by a user application program to perform image-to-text conversion of a portion of an image document specified by the user application program.

8. The system of claim 5 further comprising a telephone facsimile subsystem
   (i) connected to receive an image document from the image access subsystem,
   (ii) connected to provide an image document to the image access subsytem,
   (iii) adapted for connection to a telephone line,
   (iv) arranged to send, over a telephone line to a remotely located facsimile machine, an image retrieved by the image access subsystem, and
   (v) arranged to provide to the image access subsystem an image received over a telephone line from a remotely located facsimile system.

9. An office automation system comprising:
   (A) a plurality of bulk image storage devices, at least two of which use different types of storage media,
   (B) means for defining logical groups of images stored on any of said bulk image storage devices as image documents and associating with each image document a logical document identifier that is sufficiently independent of the type of medium on which the associated images are stored that these images can still be accessed by use of the same logical identifier even if they are moved to a storage medium of a different type,
   (C) an image access subsystem for receiving a logical document identifier and for providing access to images, which are stored on said storage devices, of the image document associated with the received logical document identifier in a manner independent of the type of medium on which each of the images is stored,
   (D) a word processing subsystem arranged to provide a logical document identifier to the image access subsystem and to display an image identified thereby as a part of a word processing document,
   (E) a data base subsystem providing a field data type of the type "image document" by which an image document can be associated with a data base record in such a way that the image document can be retrieved from said storage devices by providing the content of an "image document" field to the image access subsystem as a logical document identifier,
   (F) an electronic mail subsystem for delivering message packages including image documents retrieved from said storage devices by providing a logical document identifier to the image access subsystem.

* * * * *

UNITED STATES PATENT AND TRADEMARK OFFICE
CERTIFICATE OF CORRECTION

PATENT NO. : 4,918,588

DATED : April 17, 1990

INVENTOR(S) : Richard M. Barrett, Murray Edelberg, Joseph A. Nicholls, Clinton J. O'Brien, and Bruce R. Silver It is certified that error appears in the above-identified patent and that said Letters Patent is hereby corrected as shown below:

Claim 6, line 1, at column 23, line 56, The reference to "claim 4" should read —claim 5—.

Signed and Sealed this

Eleventh Day of January, 1994

Attest:

BRUCE LEHMAN

Attesting Officer

Commissioner of Patents and Trademarks